United States Patent
Passwater et al.

[11] Patent Number: 6,164,117
[45] Date of Patent: Dec. 26, 2000

[54] INCLINATION SENSOR AND METHOD OF MEASURING THE ACCURACY THEREOF

[75] Inventors: Shawn C. Passwater, Metamora; Stephen K. Phelps, Chillicothe; Robert R. Sychra, Washington, all of Ill.

[73] Assignee: Caterpillar Inc., Peoria, Ill.

[21] Appl. No.: 09/235,788

[22] Filed: Jan. 22, 1999

[51] Int. Cl.[7] .................................................. G01C 7/30
[52] U.S. Cl. ........................................................... 73/1.78
[58] Field of Search ................................... 73/1.75, 1.78; 702/92, 94, 151, 154

[56] References Cited

U.S. PATENT DOCUMENTS

| | | | |
|---|---|---|---|
| 4,486,844 | 12/1984 | Brunson et al. | |
| 4,912,662 | 3/1990 | Butler et al. | |
| 5,621,157 | 4/1997 | Zhao et al. | 73/1.38 |
| 5,731,761 | 3/1998 | Sychra | 340/689 |
| 5,841,668 | 11/1998 | Pahk et al. | |

FOREIGN PATENT DOCUMENTS

8240611  9/1996  Japan.

*Primary Examiner*—Robert Raevis
*Attorney, Agent, or Firm*—Haverstock, Garrett & Roberts

[57] ABSTRACT

The present invention pertains to an inclination sensor construction that is capable of determining the pitch and roll of a machine or machine implement. Moreover, the present invention may be employed to detect the pitch and roll of a blade of a motor grader or bulldozer. The invention is directed to a method of detecting the native inaccuracy of an inclination sensor and providing compensation values to correct for errors in the sensor output, and to an inclination sensor construction that makes use of such compensation values to produce highly accurate inclination sensor construction outputs, and contemplates the inclusion in the inclination sensor construction of a microprocessor that has stored therein compensation values that are utilized during operation of the inclination sensor construction to correct the native outputs of individual transducers to take into account recognized inaccuracies of such native outputs relative to actual inclination values. Thus, there is provided an inclination sensor construction that has the capability to correct native output values from component transducers with compensating offset values for errors that may be due to misalignment, skewing, and so forth.

18 Claims, 10 Drawing Sheets

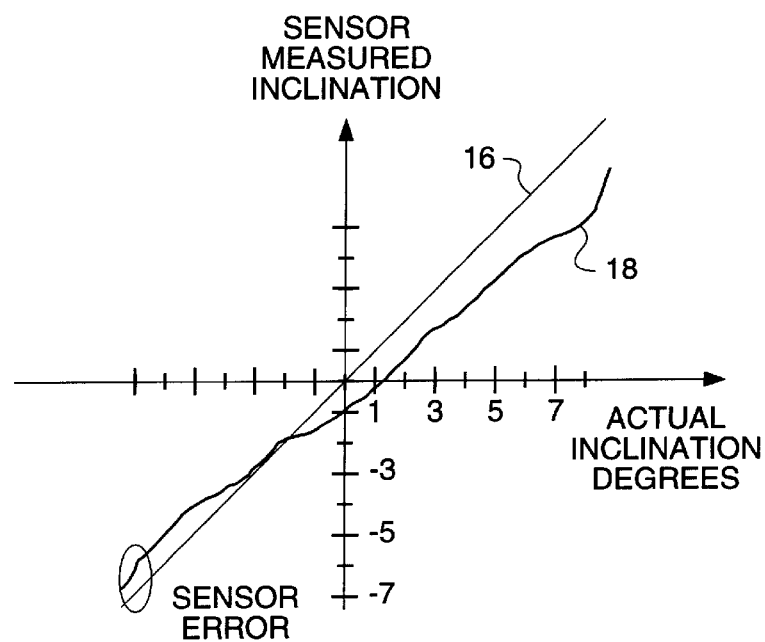
Fig_2a_
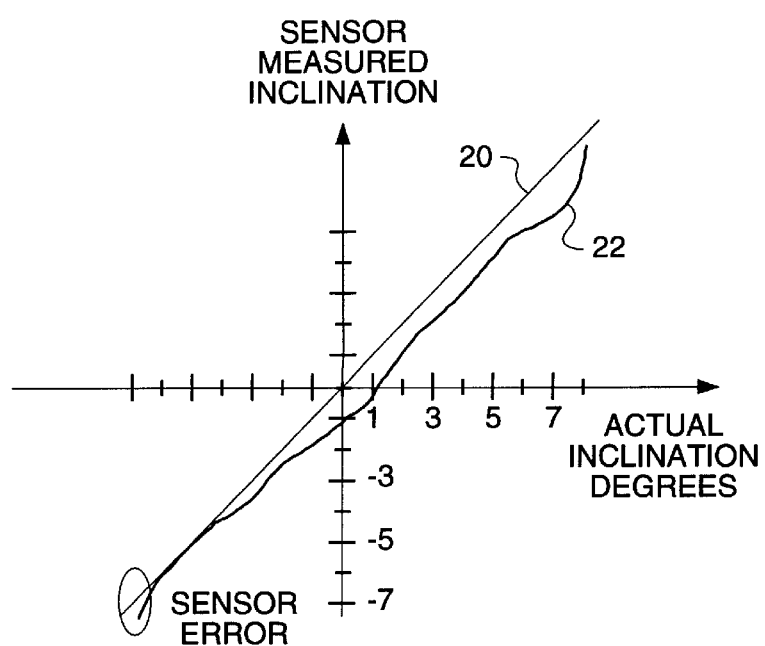
Fig_2b_

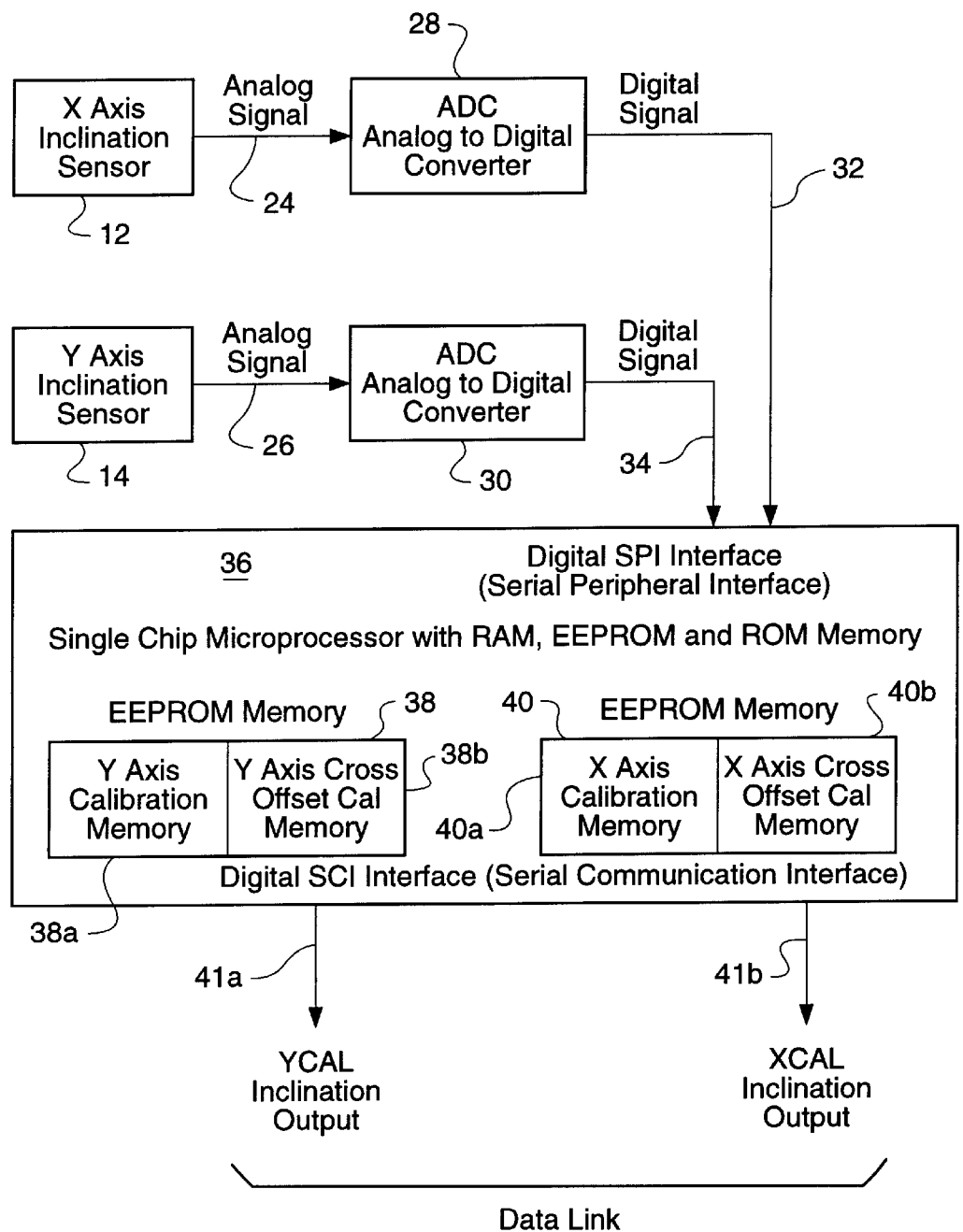

Fig_5_
Primary Axis / X Axis Calibration Table
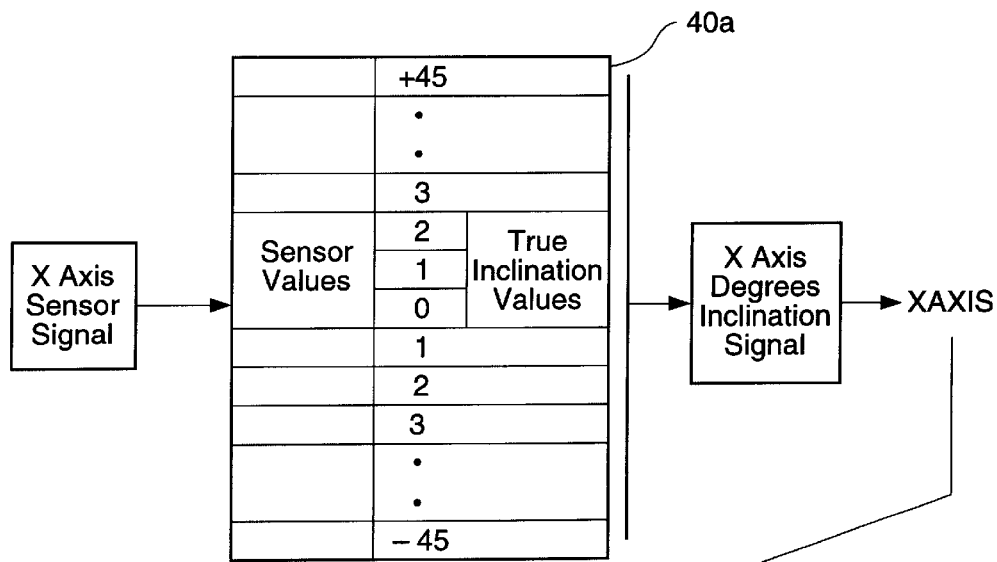
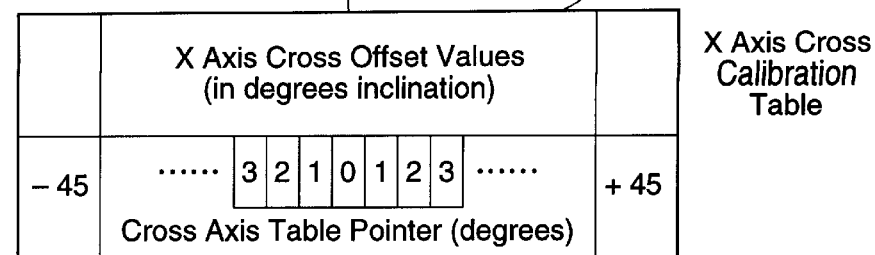

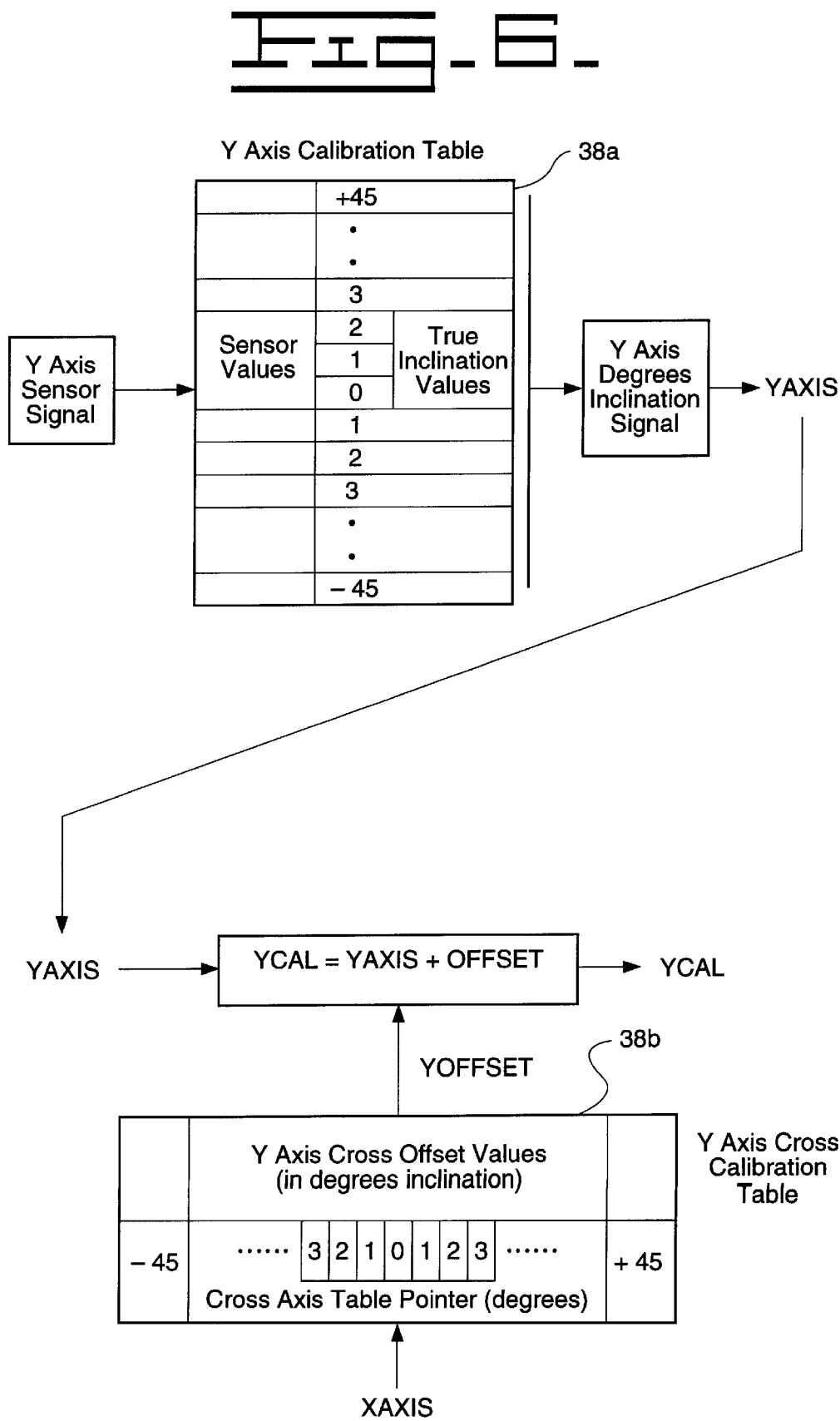

Fig_8_

INCLINATION SENSOR AND METHOD OF MEASURING THE ACCURACY THEREOF

TECHNICAL FIELD

This invention relates generally to an inclination sensor construction for measuring the inclination of an object about one or more axes of rotation orthogonal to the earth's gravitational field, and more particularly to an inclination sensor construction for measuring pitch and roll within a plane perpendicular to the earth's gravitational field and to a means and method for obtaining and utilizing correction signals in association with the outputs of transducer components of the sensor construction to achieve more accurate inclination sensor construction outputs.

BACKGROUND ART

Inclination sensors and transducers have broad applications in earth-moving, pavement management, and other construction equipment. Along with providing information for control of the mainframe of the equipment, the inclination sensors can provide feedback for the inclination or control of the machine tool, bucket, or blade, etc. The accuracy of the output of the sensor may be affected by variations in the gain and offset of the sensor's electronics, the linearity of the sensor, or the alignment of the sensor in the sensor package.

Inclination sensors based on fluid transducers have long been utilized, but are subject to cross axis errors caused by a change in the rotation of the fluid within the sensor's cross section. Because a slope control system operates with as much accuracy as can be achieved, typically a few hundredths of a degree, these errors are significant often 5 to 20 percent of the measurement. These errors generally increase with the magnitude of the cross axis inclination.

In recent years solid state microstructures have sometimes been used in place of fluid transducers. With such sensors, sensor alignment errors can be introduced during manufacturing. The main source of error results when, due to a cross axis deviation, the primary sensor is oriented at a +/−degree of rotation relative to the desired or primary plane of measurement.

Other sources of error may be due to various factors, including variations of temperature.

In U.S. Pat. No. 5,731,761 issued to the assignee of the present application, an inclination sensor is disclosed that includes an oven, a resistive element attached to the oven, an inclination transducer mounted in the oven, and a thermistor mounted to the oven, the purposes of which components are to compensate and correct for errors arising due to variations in temperature. The thermistor produces a signal representative of the actual temperature of the oven. A microprocessor receives the actual temperature signal of each inclination device and produces a heating signal to energize resistive elements to control the temperature of the respective ovens to a desired temperature. Such patent teaches a method to compensate for errors in inclination sensors due to temperature.

It would be desirable if there were provided an inclination sensor that could correct for errors due to temperature, vibration, misalignment and other factors that the sensor might be subjected to.

Accordingly, the present invention is directed to overcoming one or more of the problems as set forth above.

DISCLOSURE OF THE INVENTION

In one aspect of the present invention, an inclination sensor construction is disclosed that corrects the native output of the sensor to compensate for errors therein arising from various sources, such as misalignment as well as gain, offset, and linearity errors of the sensor. The inclination sensor construction has a microprocessor or other control/memory structure suitable for storing correction values to compensate for these errors and for producing compensated inclination sensor construction outputs.

Another aspect of this invention is directed to a method of testing an inclination sensor construction to establish calibrated correction curves or tables that are stored in the microprocessor and utilized during operation of the inclination sensor construction to produce compensated inclination sensor construction outputs. The native outputs of the sensor are compared to precision positioning outputs of calibration testing equipment to produce correction values to compensate for the various errors of the sensor. Once these compensation values are stored in the microprocessor, the output of the sensor can thereafter be adjusted to compensate for variations in the output that are due to these errors.

BRIEF DESCRIPTION OF THE DRAWINGS

FIGS. 2a and 2b are illustrative graphs depicting, for different cross axial orientations, the correspondence between a typical sensor output signal and true inclination position, with reference to an ideal output signal;

FIG. 3 is a block diagram of a preferred embodiment of the invention depicting the associations between various of the individual components.

FIG. 5 illustrates the architecture of the x-axis calibration and offset tables stored in the memory of the inclination sensor construction's microprocessor;

FIG. 6 illustrates the architecture of the y-axis calibration and offset tables stored in the memory of the inclination sensor construction's microprocessor.

BEST MODE FOR CARRYING OUT THE INVENTION

Figure 1:
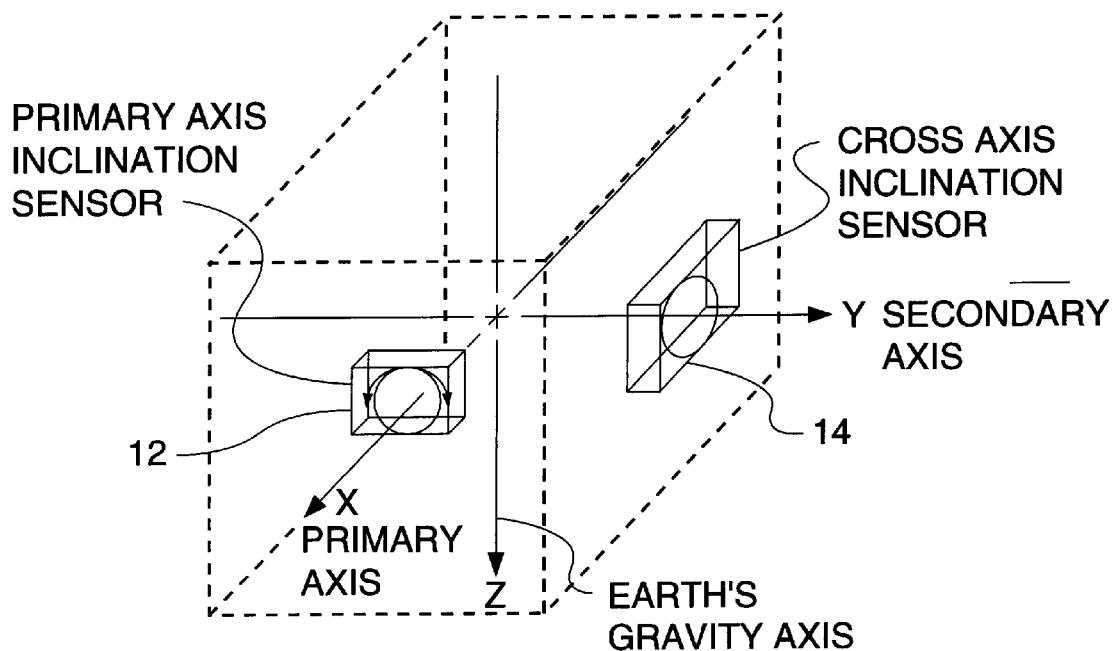
FIG. 1 is a block diagram representative of an inclination sensor construction showing two inclination transducer components in an x, y, z coordinate system illustrating the orientation of the primary and secondary axes inclination transducer components and the earth's gravity.

The present invention relates to an inclination sensor construction that is capable of determining the pitch and roll of a machine or machine implement to which it is mounted. Referring to FIG. 1 there is shown a block diagram of an inclination sensor construction 10. The inclination sensor construction 10 includes two inclination transducers 12 and 14 that are contained in a housing (not shown). These inclination transducers may be of the fluid type or the micro-machined solid state type well known to those skilled in the art, including sensors of the type manufactured by Analog Devices, Endevco, Kistler or other manufacturers. The inclination transducers 12 and 14 are mounted orthogonally to one other in a substantially horizontal plane in the housing to detect the inclination or tilt in two axes of orientation. The inclination transducer 12 is capable of detecting the roll of a machine, while the other inclination transducer 14 detects the pitch of the machine. The housing may be of any type that fully encloses the transducers 12 and 14 for protection.

The transducers 12 and 14 produce native output signals, which may be either analog or digital signals, that are representative of the pitch and roll of the machine or device to which the inclination sensor construction 10 is attached. These signals are then processed in a manner such as is hereinafter described. The native output of the sensor construction may contain errors due to temperature, vibration, misalignment or other factors that the sensor may be subjected to.

Referring to FIGS. 2a and 2b there are shown illustrative graphs of typical native outputs of an inclination sensor construction for two different cross axial orientations of the sensor construction, relative to the true inclination of a machine and depicted with reference to an ideal output. FIG. 2a shows a graph of the native output signal from an inclination sensor construction on the y graph axis versus the true inclination position of the machine being monitored when there is zero cross axis of inclination. The line 16 is the ideal accuracy line, while line 18 represents the actual sensor measurement. This graph shows non-ideal accuracy characteristics even with zero cross axis inclination. These characteristics can include rotation away from the ideal accuracy line, skewing along either or both the x and y-axis, and random variations in the output.

FIG. 2b is similar to FIG. 2a but shows a graph of the output signal from an inclination sensor construction on the y graph axis versus the true inclination position of the machine being monitored when there is a +5 degree cross axis inclination. Line 20 is the ideal accuracy line, while line 22 represents the actual measurement. These types of errors can be observed in varying magnitudes in all inclination sensors.

FIG. 3 illustrates a representational block diagram of the a preferred embodiment of an inclination sensor construction 10 depicting various components and the interconnections therebetween. The inclination transducers 12 and 14, which may be of well known conventional designs, each produce an analog output signal 24 and 26, respectively. These signals are then inputted into respective analog to digital converters (ADC) 28 and 30, which may likewise be of well known designs. The analog to digital converters operate to convert the analog input signals to digital outputs 32 and 34 which are provided to a microprocessor 36. The microprocessor 36 includes programmable memory which includes programmable memory portions 38 and 40, each of which portions 38 and 40 can be considered associated with a respective transducer 14 or 12. These memory portions include calibration information that is stored therein to compensate for errors in the native outputs of the transducers 12 and 14. In operation, the microprocessor operates to produce outputs 41a and 41b, which are identified, respectively, as XCAL Inclination Output and YCAL Inclination Output. The XCAL Inclination Output 41a is a function of the signal at output 32 of ADC 28 and of corresponding compensation information stored in memory portion 40, and the YCAL Inclination Output 41b is a function of the signal at output 34 of ADC 30 and of corresponding compensation information stored in memory portion 38, as will be described in greater detail hereinafter. In effect, the outputs 32 and 34 are adjusted by the microprocessor 36 to compensate for deviation in the transducer outputs from the true accuracy lines, such as the ideal output lines, shown in FIGS. 2a and 2b. The memory portions 38 and 40 contain values in the form of curves or tables to compensate for and offset previously determined errors or inaccuracies in the inclination transducers' native outputs.

Figure 4:
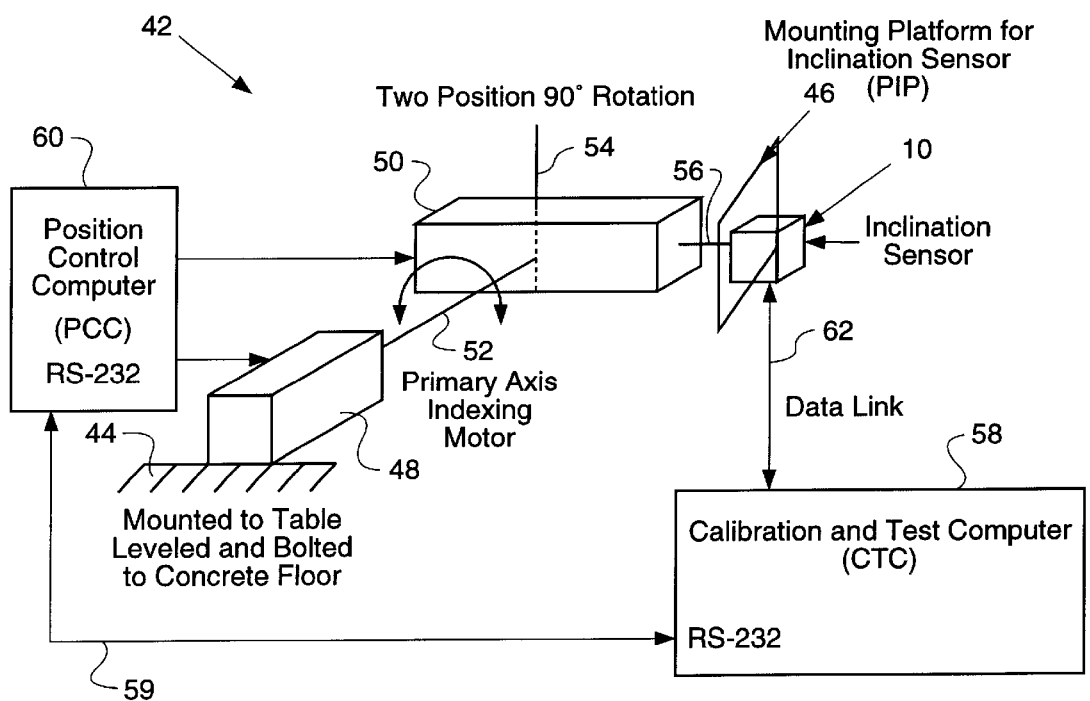
FIG. 4 is a block diagram of calibration apparatus for an inclination sensor incorporating the principles of this invention.

The compensation values stored in the microprocessor 36 are determined utilizing a calibration apparatus 42 such as is depicted in FIG. 4. The calibration apparatus 42, which may include a Precision Indexing Platform (PIP) of known design, provides for the precise positioning of the inclination sensor construction relative to earth's gravity. The apparatus 42 is mounted on a platform 44 that is leveled, such as by leveling screws to zero the mounting platform, and bolted to a concrete floor. The primary axis x indexing system is mounted to the platform 44. When the apparatus is positioned at zero primary axis rotation and zero cross axis inclination, the apparatus is calibrated to earth's gravity with two visual fluid levels (not shown) mounted on a repositionable indexing platform 46. These levels are accurate to 20 arc seconds.

The calibration apparatus includes two motors 48 and 50 with encoder position feedback control, which produce rotational positioning of the output shaft to 0.001-degree resolution. The output shaft 52 of the primary indexing system provides x-axis rotation of the secondary y-axis indexing system 54. The output shaft 56 of the secondary indexing system provides y-axis rotation of the indexing platform 46, to which the inclination sensor construction 10 is mounted. The resulting system permits the indexing platform 46 to be oriented to any position within plus and minus 45 degrees of rotation of the x and y axes.

In order to obtain the compensation factors that are to be stored in the memory portions 38 and 40, the indexing platform 46 is moved through a sequence of calibration positions within approximately plus and minus 45 degrees of rotation of the x and y axes to determine, for each calibration position, the corresponding native inclination values produced by the inclination sensor construction 10. The actual position values, corresponding to the signal on data link 59 between a calibration and test computer (CTC) 58 and a position control computer (PCC) 60, can be made available to the microprocessor 36 (and its memory portions 38 and 40) of inclination sensor construction 10 via data link 62 from calibration and test computer 58. Such values are stored for comparison and use with the native readings produced by the inclination sensor construction 10.

During calibration of an inclination sensor construction 10, the calibration and test computer 58 has control over a position control computer 60 through data link 59. The calibration and test computer 58 operates to effect movement of the indexing platform 46 through all the desired calibration positions. For each desired calibration position the calibration and test computer provides position data over data link 59 to position control computer 60 such that position control computer 60 provides appropriate drive information to the x-axis and y-axis indexing motors to position the indexing platform 46 to the appropriate calibration testing orientation. It is generally advisable to delay any reading of inclination values produced by inclination sensor construction 10 sufficiently long enough to permit any vibration to subside. The native inclination output values produced by the inclination transducers can then be stored in calibration tables in memory in the inclination sensor construction 10 so as to associate particular native output values with corresponding actual inclination positions. After completing all of the calibration positions, the calibration and test computer 58 may preferably go back to each position and verify the native inclination output produced by inclination sensor construction 10 for that calibration position.

From the described process, native output values are obtained that correspond to the actual inclination positions of the inclination sensor construction 10. Such output values can be stored in calibration and offset lookup tables in the memory of the inclination sensor construction 10 so that, during use of the inclination sensor construction, more accurate sensor outputs than the native outputs of the individual transducers 12 and 14 can be developed. One particular manner in which this can be accomplished is illustrated by the following discussion of one particular architecture for the x and y axes calibration and offset tables and the manner in which the values stored therein are obtained by the calibration process discussed in general hereinabove. This procedure stores the true inclination values in the microprocessor 36 of the inclination sensor construction 10.

FIGS. 5 and 6 illustrate one possible architecture for the x and y axes calibration and offset tables stored in the memory of the inclination sensor construction's microprocessor 36. FIG. 5 corresponds generally to memory portion 40 of FIG. 3 and FIG. 6 corresponds generally to memory portion 38 of FIG. 3. The x axis memory portion 40 can be viewed in this instance as including an x axis calibration table 40a and an x axis cross offset table 40b whereas the y axis memory portion 38 can be viewed in this instance as including a y axis calibration table 38a and a y axis cross offset table 38b.

FIGS. 7–10 are flow charts illustrating a particular calibration technique that can be employed with the memory architecture of FIGS. 5 and 6 to obtain the data entries stored in the calibration and cross offset tables of FIGS. 5 and 6.

Figure 7:
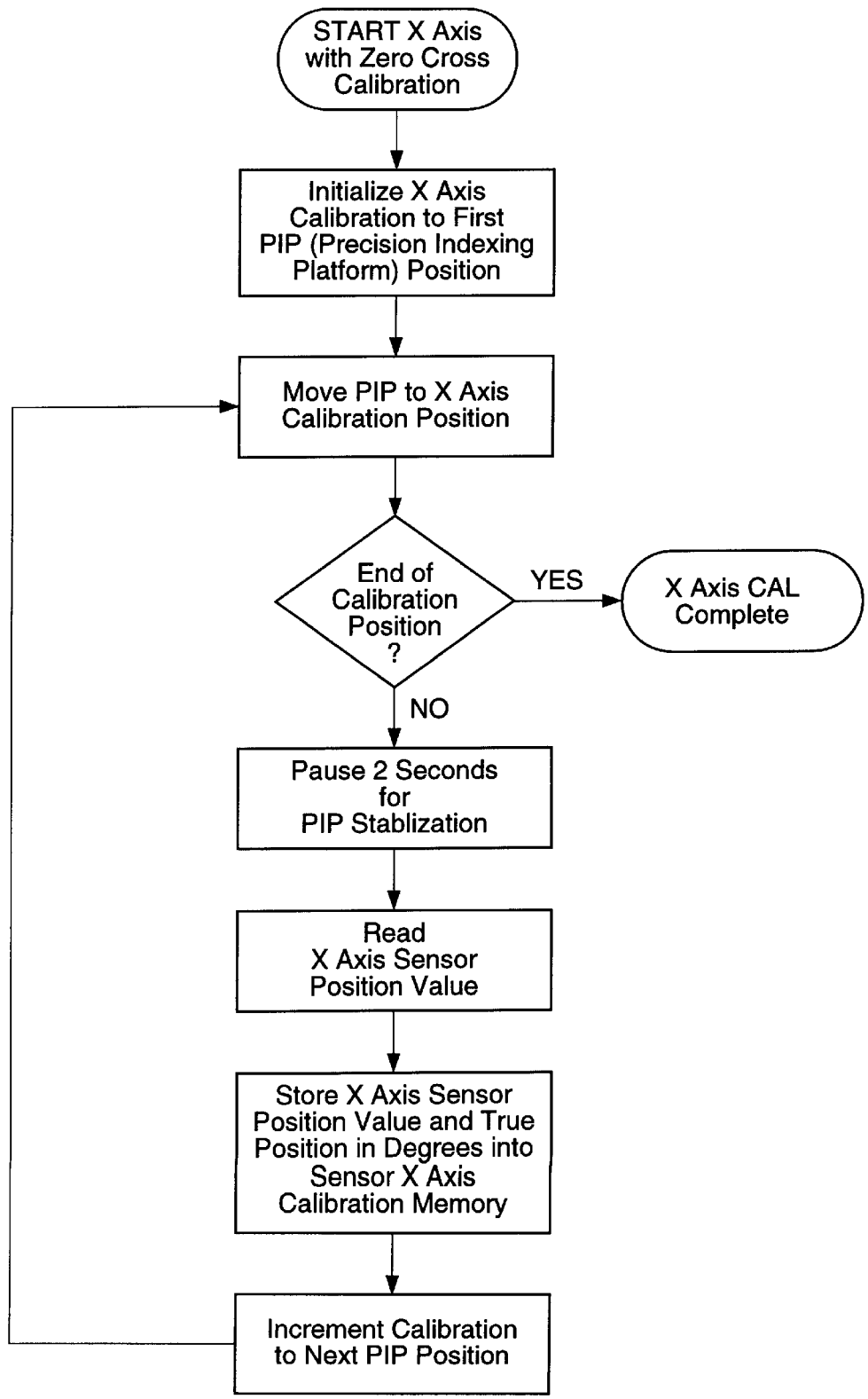
FIGS. 7–10 are flow charts of a calibration method for use with the memory architecture of FIGS. 5 and 6 for producing an inclination sensor construction incorporating the principles of this invention.

Typically, calibration and test computer 58 will first operate in accordance with program control as illustrated by FIGS. 7–10 to obtain, in accordance with FIG. 7, for given calibration points (e.g., zero pitch(i.e., y axis at zero rotation), varying roll (x axis rotation)), and to store in x axis calibration table 40a corresponding data pairs consisting of the native output values of the x axis transducer 12 and the actual x axis inclination values of the precision indexing platform 46 (and mounted installation sensor construction 10). In table 40a ninety-one (91) data pairings are referenced. It will be appreciated that greater or lesser numbers of pairings can be utilized.

Figure 8:
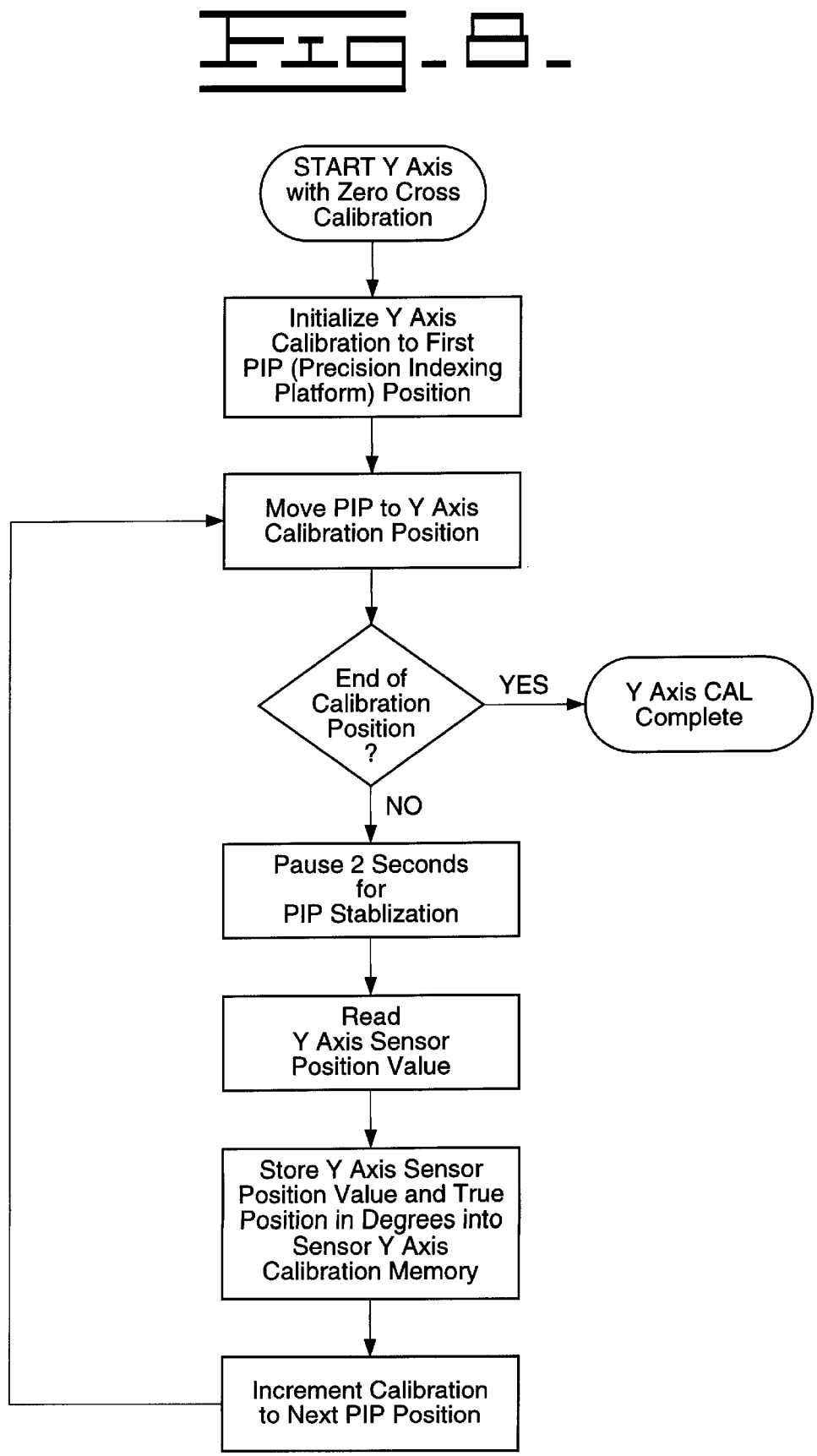

At the conclusion of the calibration program portion as illustrated by FIG. 7, calibration and test computer 58 might then typically proceed in accordance with program control as illustrated in FIG. 8 to similarly obtain and store in y axis calibration table 38a corresponding data pairs consisting of the native output values of the y axis transducer 14 and the actual y axis inclination values of the precision indexing platform 46 (and mounted installation sensor construction 10).

Figure 9:
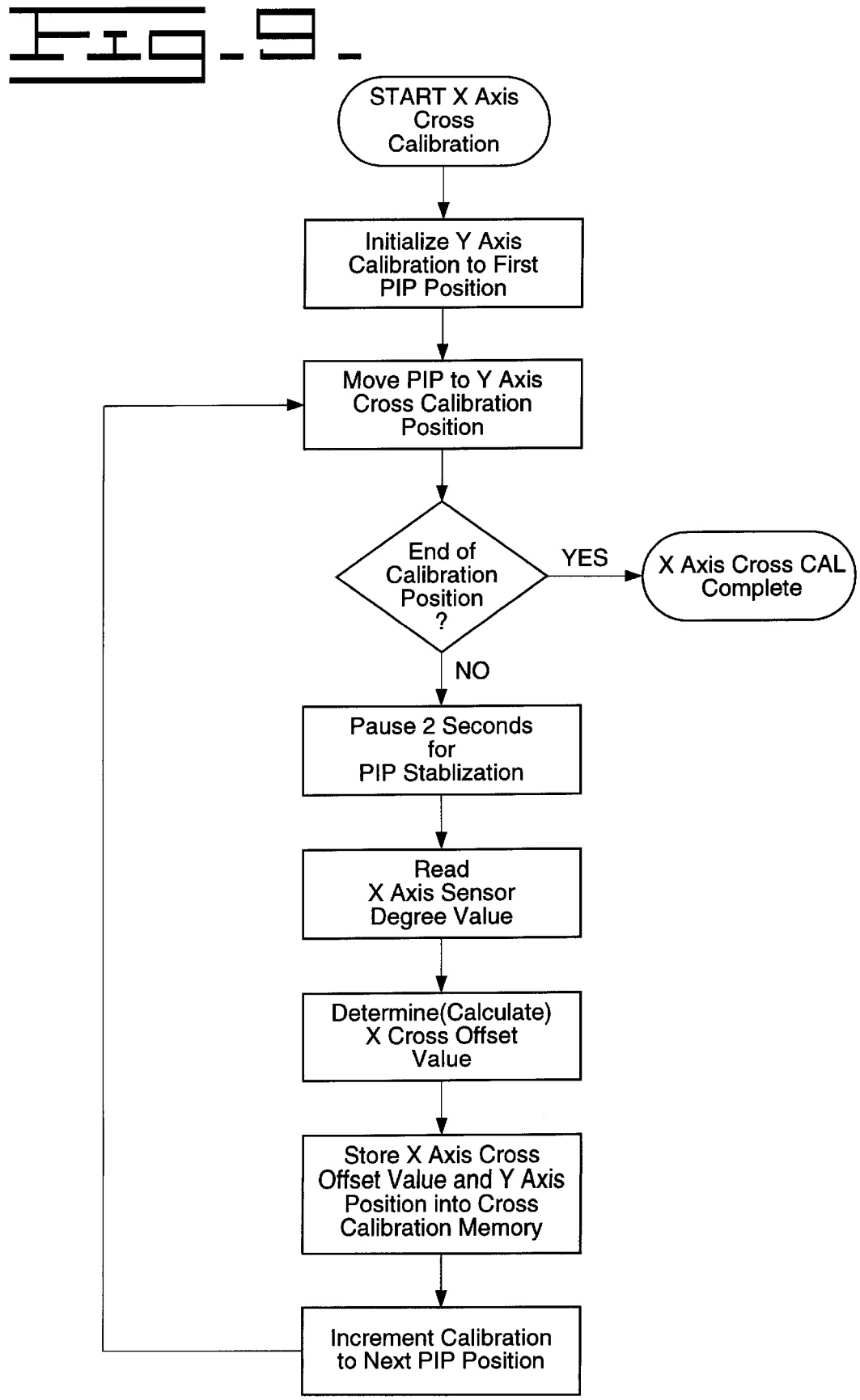
Figure 10:
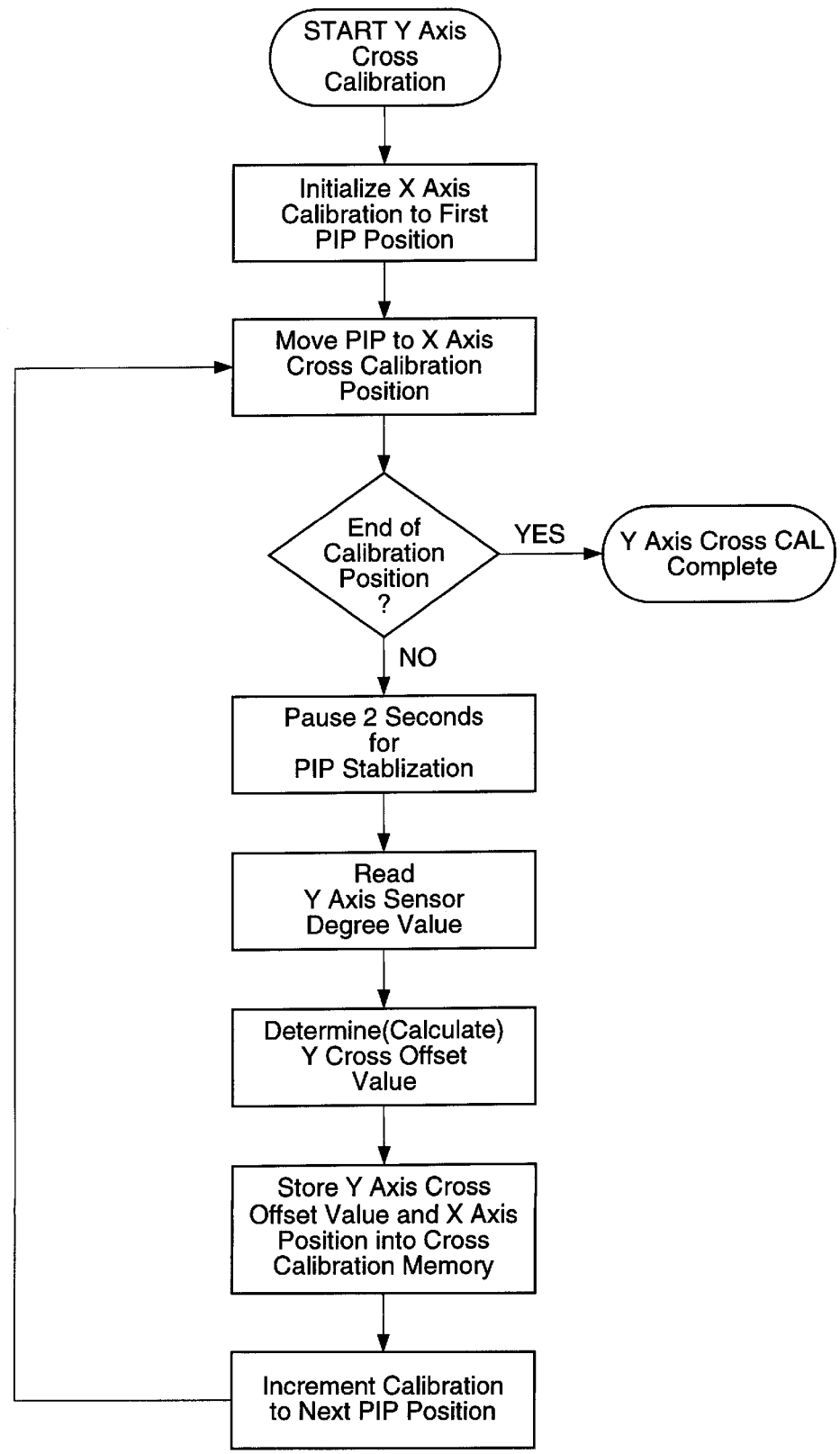

At the conclusion of the program portions of FIGS. 7 and 8, data will have been entered into x and y axes calibration tables 40a and 38a, from which XAXIS and YAXIS values can thus be determined, as noted on FIGS. 5 and 6, but data will not yet then have been compiled for the x and y axes cross offset tables 40b and 38b. FIGS. 9 and 10 illustrate the manner in which such data can be obtained and entered in such tables.

In accordance with FIG. 9, the calibration and test computer 58 can operate to effect the production at given calibration points (e.g., x axis maintained level, varying pitch (y axis rotation)) of native outputs of the x axis transducer 12, to determine from such native outputs x axis cross offset values, and to store in x axis cross offset table 40b corresponding data pairs consisting of the determined x axis cross offset values and y axis values (YAXIS).

As is noted in FIG. 6, YAXIS is the true y inclination value that corresponds to the native output produced by the y axis sensor when the precision indexing platform 46 was positioned at such y inclination value (with zero x inclination). As will be appreciated from FIGS. 2a and 2b, as cross axis values change, varying cross offset values may be required for compensation purposes. For example, it may be observed in FIG. 2a that, for zero cross axis, the sensor error at −5 degrees actual inclination is approximately −1 degree (the difference between −5 degrees actual inclination and −4 degrees transducer reading inclination) whereas, for +5 degree cross axis, the sensor error at −5 degrees actual inclination is essentially zero. By way of illustration, then, if XAXIS were to be −5 degrees, it might be determined that for a YAXIS of zero degrees, the x axis cross offset value should be −1 and for a YAXIS of +5 degrees, the x axis offset value should be zero. It will thus be appreciated that the step in FIG. 9 of determining or calculating the particular offset value to be stored in the data pairing with the YAXIS value can be effected in various known manners and fashions based upon various factors, including the data pairings obtained during the calibration stages illustrated by FIGS. 7 and 8.

In similar fashion, in accordance with FIG. 10, the calibration and test computer 58 can operate to effect the production at given calibration points of native outputs of the y axis transducer 14, to determine from such native outputs y axis cross offset values, and to store in y axis cross offset table 38b corresponding data pairs consisting of the determined y axis cross offset values and x axis values (XAXIS).

After calibration is completed, including any verification of values such as has been discussed hereinabove, the inclination sensor construction 10 can be installed for use and can then operate under program control to utilize native outputs produced by the x and y axis transducers 12 and 14 to produce compensated x and y axis inclination values XCAL and YCAL that offer enhanced accuracy and reliability. During operation, microprocessor 36 will receive, at a given sample time, an (x, y) data pair wherein the x value is the native output of the x axis transducer 12 and the y value is the native output of the y axis transducer 14. Such x and y values will be employed to retrieve XAXIS and YAXIS values from the x axis calibration table 40a and the y axis calibration table 38a. The retrieved YAXIS and XAXIS values will be employed to obtain XOFFSET and YOFFSET values, respectively, from x axis cross offset calibration table 38b and y axis cross offset calibration table 40b. The XCAL and YCAL values can then be generated according to the formulas XCAL=XAXIS+XOFFSET and YCAL=YAXIS+YOFFSET.

It will be appreciated that, although the invention has been described and discussed hereinabove with reference to and in terms of one particular memory architecture and related calibration flow charts, other memory architectures and, other calibration sequences could be employed as part of or to effect the present invention.

Thus, although there has been illustrated and described a specific embodiment, it is clearly understood that such embodiment was referenced merely for purposes of illustration and that changes and modifications may be readily made therein by those skilled in the art without departing from the spirit and scope of this invention.

INDUSTRIAL APPLICABILITY

The present invention pertains to an inclination sensor construction that is capable of determining the pitch and roll of a machine or machine implement. For example, the present invention may be employed to detect the pitch and roll of paving machines such as an asphalt paver, or cold planer. Moreover, the present invention may be employed to detect the pitch and roll of a blade of a motor grader or bulldozer. The invention application describes a method of detecting the native inaccuracy of an inclination sensor and providing compensation values to correct for errors in the native sensor output, and contemplates the inclusion in the inclination sensor construction of a microprocessor that has stored therein compensation values that are utilized during operation of the inclination sensor construction to correct the native outputs of individual transducers to take into account recognized inaccuracies of such native outputs relative to actual inclination values.

Other aspects, objects and advantages of the present invention can be obtained from a study of the drawings, the disclosure and the appended claims.

What is claimed is:

1. An inclination sensor construction comprising:
   a) a first inclination transducer disposed to produce a native electrical output signal representing the degree of rotation of said first transducer about an axis relative to the earth's gravity;
   b) a second inclination transducer mounted substantially orthogonal to the first inclination transducer disposed to produce a native electrical output signal representing the degree of rotation of said second transducer about an axis relative to the earth's gravity; and
   c) a microprocessor adapted to receive the native output signals of the first and second transducers and adjusting said native output signals with compensation information to correct the native output signals of the first and second transducers for deviations from reference values, said compensation information being associated with a plurality of cross axis reference values.

2. An inclination sensor construction as recited in claim 1 wherein the microprocessor has calibration and offset tables to store compensation values for previously measured errors in the native transducer output signals.

3. An inclination sensor construction as recited in claim 2 wherein the first and second transducers are fluid types.

4. An inclination sensor construction as recited in claim 2 wherein the first and second transducers are solid state microstructures.

5. An inclination sensor construction for detecting orientation relative to two axes of rotation comprising a transducer sensing portion including first and second inclination transducers disposed substantially orthogonal to one another and to the earth's gravitational field, each of said transducers operable to produce for a given orientation of said transducer sensing portion transducer native output signals representative of the degree of rotation of said transducer about its respective axis of rotation, said transducer native output signals for a given orientation of said transducer sensing portion defining a transducer sensing portion native output signals, and a microprocessor portion operatively connected to receive said transducer sensing portion native output signals, said microprocessor portion including a memory portion and an inclination sensor construction output, said memory portion having compensation information stored therein resulting from calibration testing of said transducer sensing portion when disposed at a plurality of calibration testing orientations, said compensation information including data corresponding to compensation values to correct deviations in the transducer sensing portion native output from calibration reference values at the plurality of calibration testing orientations, said microprocessor operable to be responsive to a transducer sensing portion native output signal at a given orientation to produce at said inclination sensor construction output an inclination sensor construction output signal based upon said transducer sensing portion native output signal and the compensation information corresponding thereto.

6. The inclination sensor construction of claim 5 wherein said memory portion includes first and second memory portions associated respectively with said first and second transducers, said first memory portion having compensation information stored therein to compensate for calibration and cross offset inaccuracies in said first transducer native output signal, said second memory portion having compensation information stored therein to compensate for calibration and cross offset inaccuracies in said second transducer native output signal.

7. The inclination sensor construction of claim 6 wherein said first memory portion includes a first axis calibration portion and a first axis cross offset portion and said second memory portion includes a second axis calibration portion and a second axis cross offset portion.

8. The inclination sensor construction of claim 7 wherein said first axis calibration portion includes first axis calibration compensation information developed during calibration testing by rotating said transducer sensing portion through a plurality of calibration testing orientations about the axis of rotation of said first transducer while holding the second transducer at a fixed degree of rotation about its axis of rotation, said second axis calibration portion includes second axis calibration compensation information developed during calibration testing by rotating said transducer sensing portion through a plurality of calibration testing orientations about the axis of rotation of said second transducer while holding the first transducer at a fixed degree of rotation about its axis of rotation, said first axis cross offset portion includes first axis cross offset compensation information developed during calibration testing, after development of said second axis calibration compensation information, by rotating said transducer sensing portion through a plurality of calibration testing orientations about the axis of rotation of said second transducer while holding the first transducer at a fixed degree of rotation about its axis of rotation, said second axis cross offset portion includes second axis cross offset compensation information developed during calibration testing, after development of said first axis calibration compensation information, by rotating said transducer sensing portion through a plurality of calibration testing orientations about the axis of rotation of said first transducer while holding the second transducer at a fixed degree of rotation about its axis of rotation.

9. The inclination sensor construction of claim 8 wherein said microprocessor is operable to produce an inclination sensor construction output signal (XCAL, YCAL) for a given orientation of the inclination sensor construction where XCAL is determined according to the formula XCAL=XAXIS+XOFFSET, YCAL is determined according to the formula YCAL=YAXIS+YOFFSET, XAXIS is a value stored in said first axis calibration portion corresponding to said first transducer output signal, YAXIS is a value stored in said second axis calibration portion corresponding to said second transducer output signal, XOFFSET is a value stored in said first cross offset portion corresponding to YAXIS, and YOFFSET is a value stored in said second offset axis portion corresponding to XAXIS.

10. A method for measuring the orientation of an inclination sensor construction having a first and second inclination transducer disposed substantially orthogonal to one another, each of said transducers operable to produce a native electrical output signal representing the degree of rotation of said transducer about an axis relative to the earth's gravity, and a microprocessor adapted to receive the native output signals, comprising the steps of:

sensing a first native electrical output signal representing the degree of rotation of the first transducer about an axis relative to the earth's gravity;

sensing a second native electrical output signal representing the degree of rotation of the second transducer about an axis relative to the earth's gravity; and adjusting said native output signals with compensation information to correct said first and second native output signals for deviations from reference values, said compensation information being associated with a plurality of cross axis reference values.

11. A method, as set forth in claim 10 further comprising the step of calibrating said sensor construction.

12. A method, as set forth in claim 11, wherein the step of calibrating said sensor construction further comprises the steps of:

(1) orienting said first and second inclination transducers to a given calibration testing position having known position values relative to the axes of said first and second transducers and detecting the transducer native output signals at such calibration testing position, (2) storing such transducer native output signals and corresponding compensation information in said said microprocessor to correct for deviations in said transducer native output signals from the known position values for said calibration testing position, (3) repeating steps (1) and (2) for a plurality of calibration testing positions.

13. The method of claim 12 wherein said memory portion includes first and second memory portions associated respectively with said first and second transducers, said first memory portion includes a first axis calibration portion and a first axis cross offset portion and said second memory portion includes a second axis calibration portion and a second axis cross offset portion, said first axis calibration and cross offset portions are configured to store compensation information to compensate for respective calibration and cross offset inaccuracies in said first transducer native output signal, said second axis calibration and cross offset portions are configured to store compensation information to compensate for calibration and cross offset inaccuracies in said second transducer native output signal, including the process of orienting said transducer sensing portion through a plurality of calibration testing positions by:

first, rotating said transducer sensing portion through a first plurality of calibration testing orientations about the axis of rotation of a first selected one of said first and second transducers while holding the other transducer at a fixed degree of rotation about its axis of rotation to effect development of calibration compensation information for storage in the calibration portion associated with the first selected one of the transducers, subsequently rotating said transducer sensing portion through a second plurality of calibration testing orientations about the axis of rotation of the other of said first and second transducers while holding the first selected one of the transducers at a fixed degree of rotation about its axis of rotation to effect development of calibration compensation information for storage in the calibration portion associated with the other of the transducers, after development of said second axis calibration compensation information, rotating said transducer sensing portion through a plurality of calibration testing orientations about the axis of rotation of said second transducer while holding the first transducer at a fixed degree of rotation about its axis of rotation to effect development of first axis cross offset compensation information for storage in the first axis cross offset portion, after development of said first axis calibration compensation information, rotating said transducer sensing portion through a plurality of calibration testing orientations about the axis of rotation of said first transducer while holding the second transducer at a fixed degree of rotation about its axis of rotation to effect development of second axis cross offset compensation information for storage in the second axis cross offset portion.

14. The method of claim 13 wherein a value designated XAXIS is stored in said first axis calibration portion in correspondence with said first transducer native output signal, a value designated YAXIS is stored in said second axis calibration portion in correspondence with said second transducer native output signal, a value designated XOFFSET is stored in said first axis cross offset portion in correspondence with value YAXIS, a value designated YOFFSET is stored in said second axis cross offset portion in correspondence with XAXIS, whereby an inclination sensor construction output (XCAL, YCAL) may be determined for a given orientation of the inclination sensor construction according to the formulas XCAL=XAXIS+XOFFSET and YCAL=YAXIS+YOFFSET.

15. An inclination sensor construction comprising:

a means for sensing a first native electrical output signal representing the degree of rotation of a first transducer about an axis relative to the earth's gravity;

a means for sensing a second native electrical output signal representing the degree of rotation of a second transducer about an axis relative to the earth's gravity; and a means for adjusting said native output signals with compensation information to correct said first and second native output signals for deviations from reference values, said compensation information being associated with a plurality of cross axis reference values.

16. An inclination sensor construction, as recited in claim 1, wherein said degree of rotation of said first transducer further represents a pitch about an axis relative to the earth's gravity, and wherein said degree of rotation of said second transducer further represents a roll about an axis relative to the earth's gravity.

17. An inclination sensor construction, as recited in claim 16, wherein said compensation information further includes predetermined compensation values.

18. An inclination sensor construction, as recited in claim 17, wherein a microprocessor is further adapted to correct the native output signals of the first and second transducers for deviations from calibration reference values associated with a plurality of calibration testing orientations.

* * * * *